July 10, 1962  W. HUGHES ETAL  3,043,659
PROCESS FOR THE PRODUCTION OF
PURIFIED SILICON DIOXIDE
Filed March 10, 1958  8 Sheets-Sheet 1

Inventors:
William Hughes,
Arthur Wallace Evans,
and
Bernard Harris
By their attorneys:
Baldwin & Wight July 10, 1962

W. HUGHES ETAL 3,043,659

PROCESS FOR THE PRODUCTION OF
PURIFIED SILICON DIOXIDE

Filed March 10, 1958

Inventors:
William Hughes,
Arthur Wallace Evans
and
Bernard Harris
By: Baldwin & Wight, Attys.

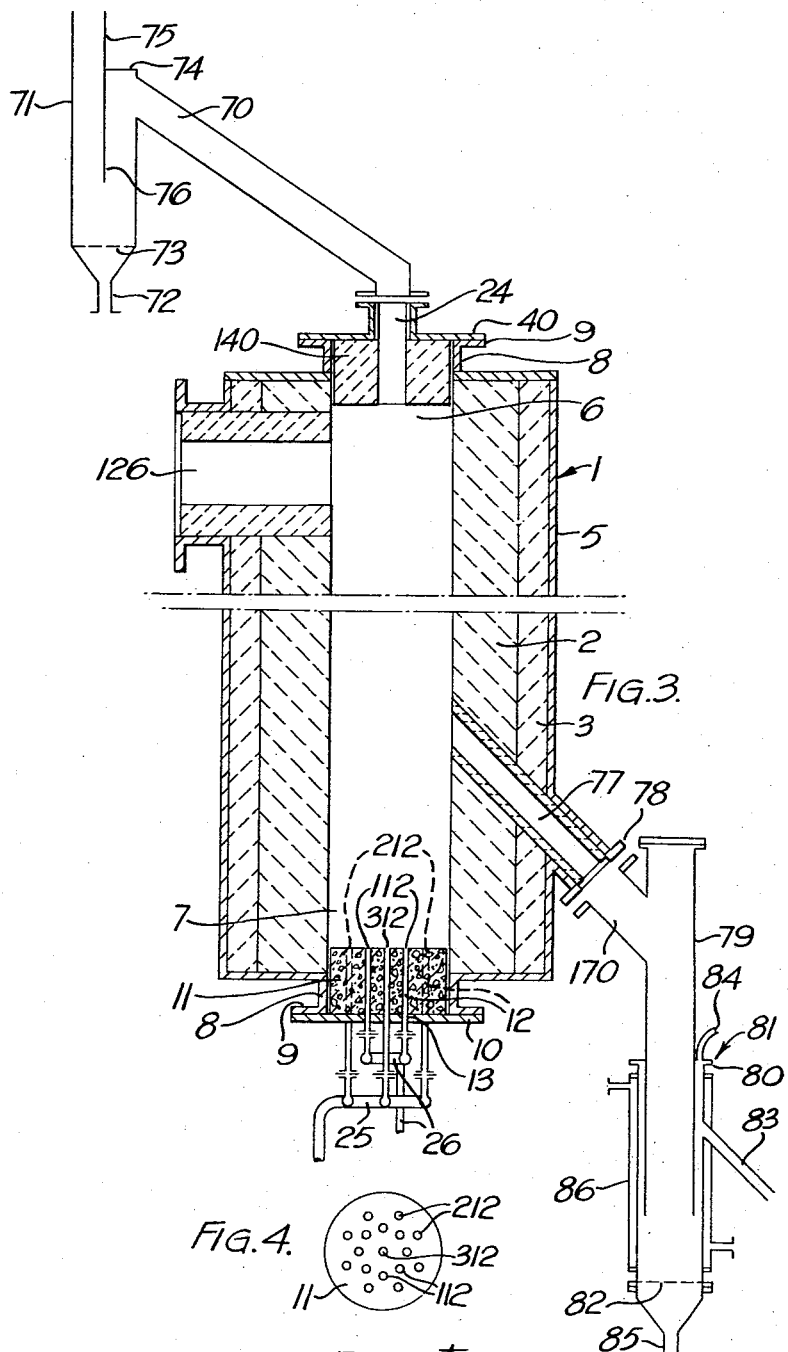

July 10, 1962 W. HUGHES ETAL 3,043,659
PROCESS FOR THE PRODUCTION OF
PURIFIED SILICON DIOXIDE
Filed March 10, 1958 8 Sheets-Sheet 4
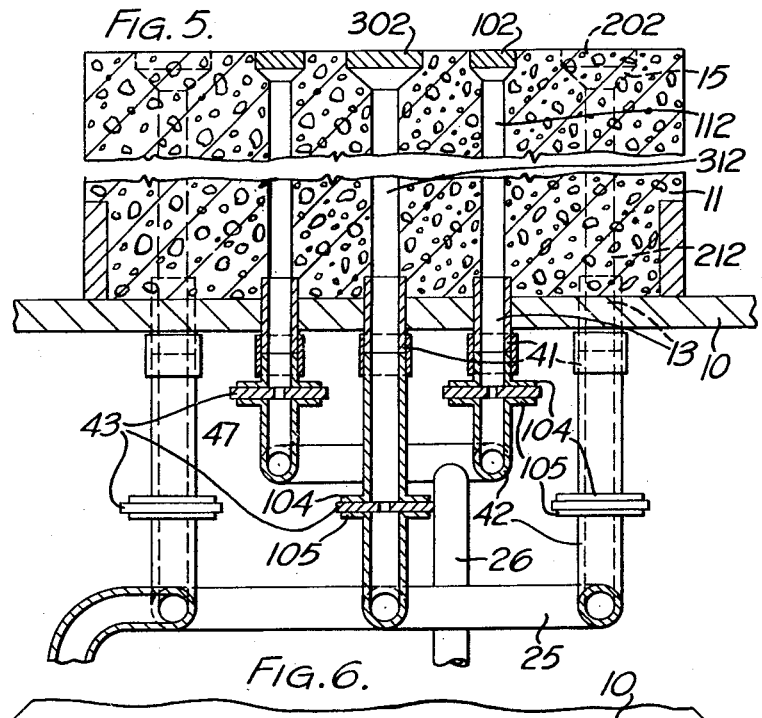
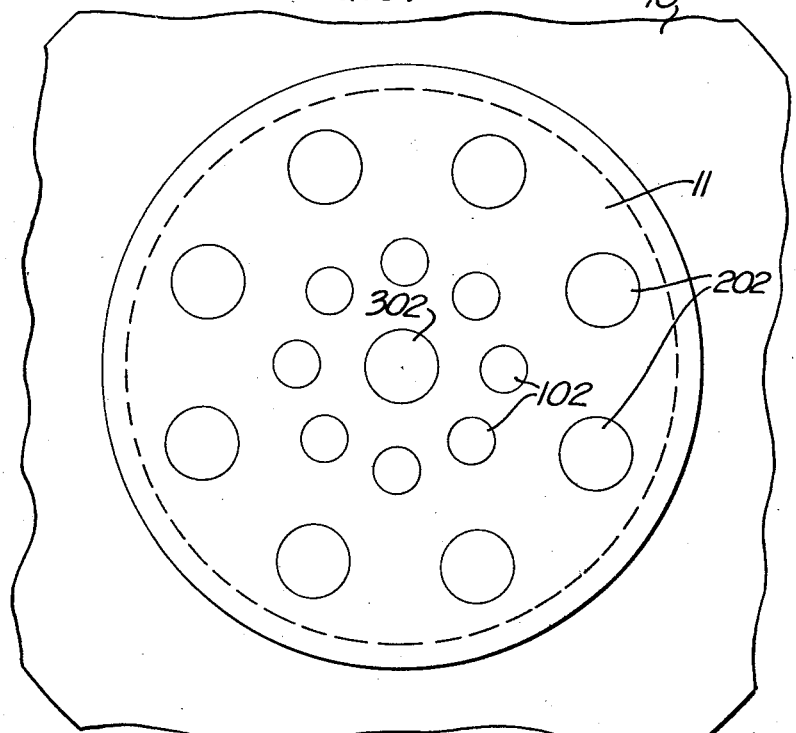
Inventors: William Hughes,
Arthur Wallace Evans, & Bernard Harris
By: Baldwin & Wight, Attys.

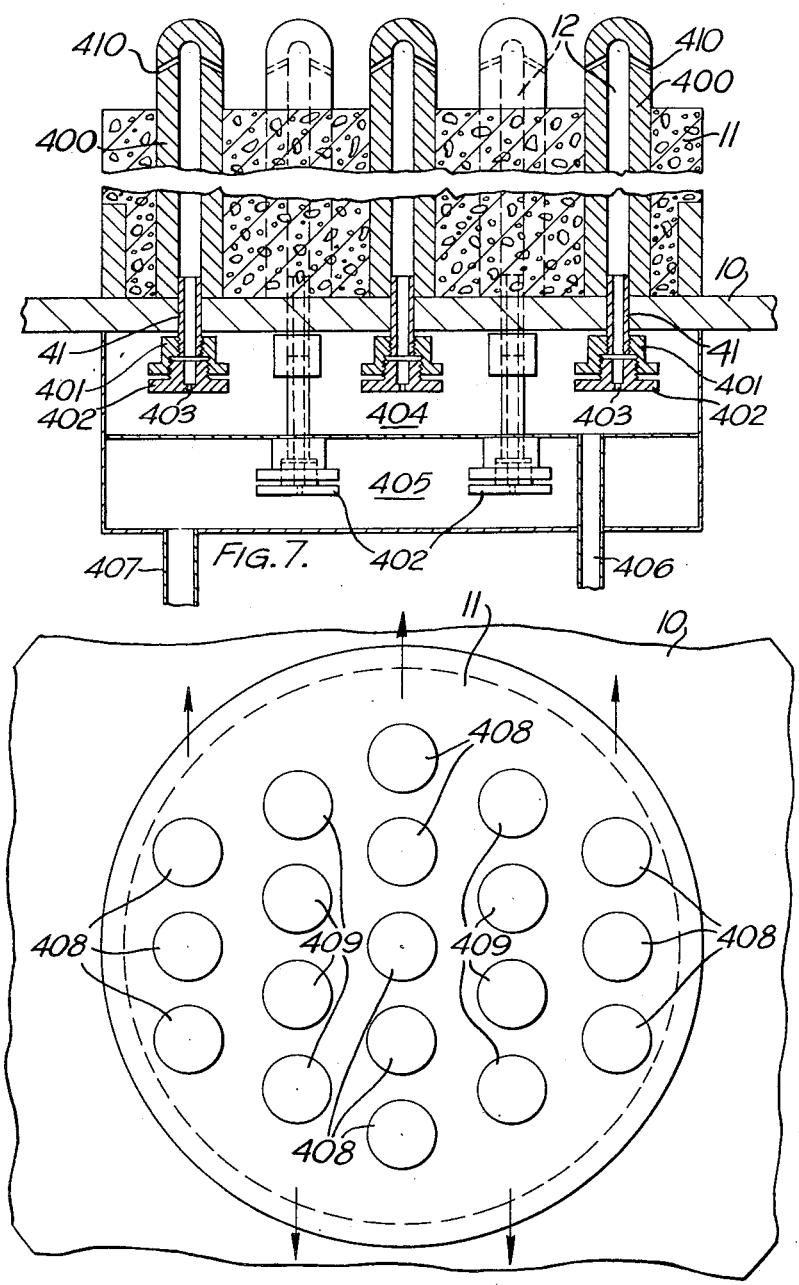

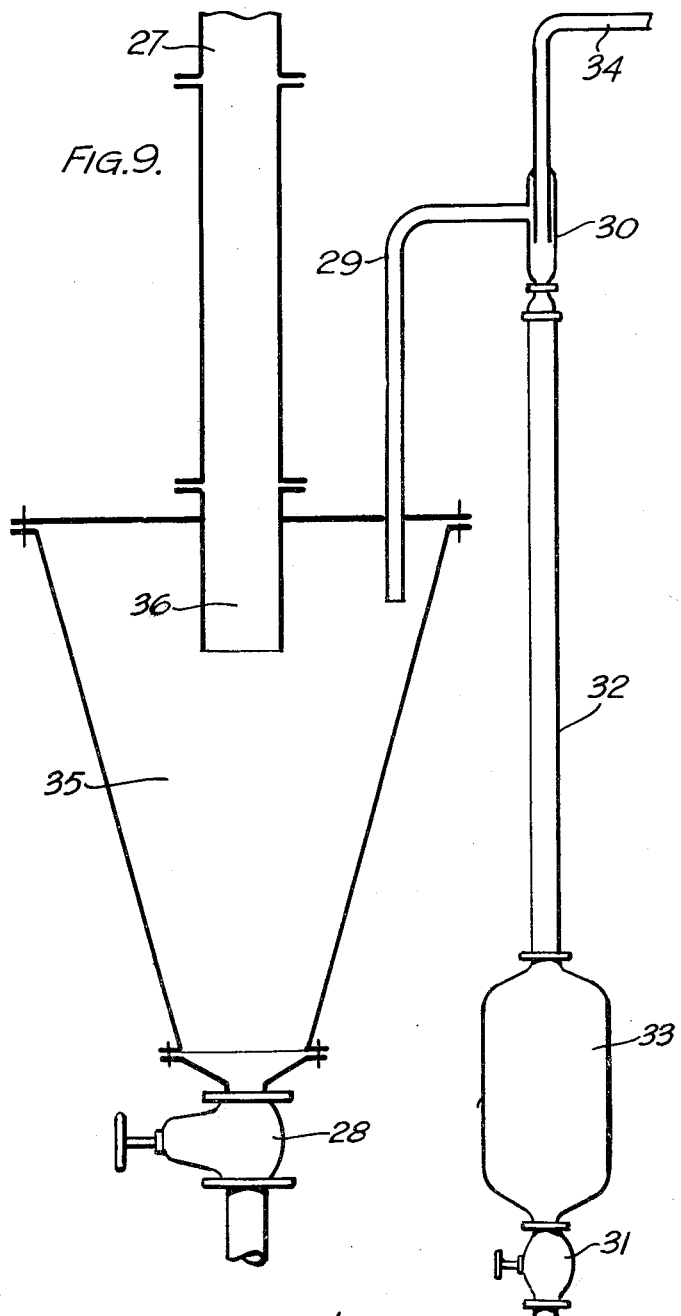

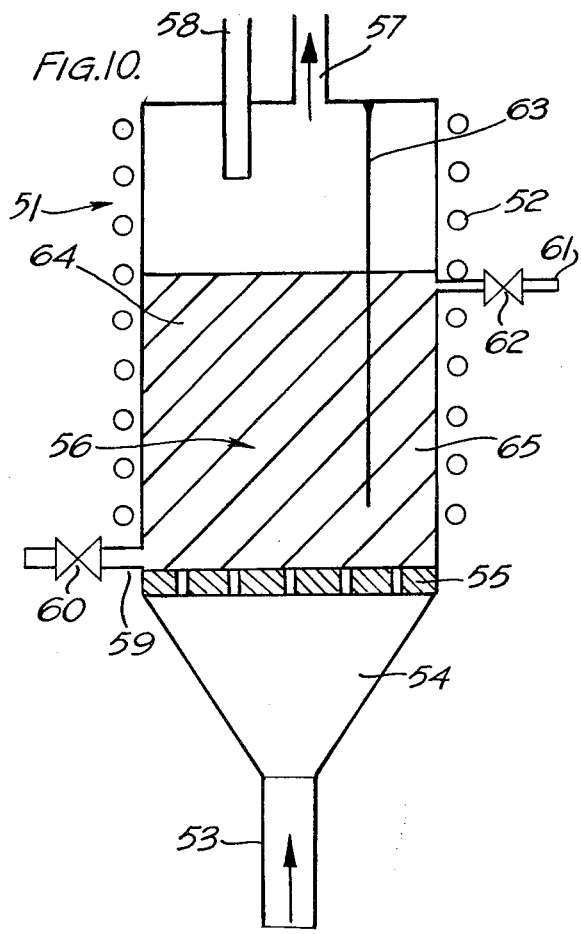

July 10, 1962 W. HUGHES ETAL 3,043,659
PROCESS FOR THE PRODUCTION OF
PURIFIED SILICON DIOXIDE
Filed March 10, 1958 8 Sheets-Sheet 8

United States Patent Office 3,043,659
Patented July 10, 1962

1

3,043,659
PROCESS FOR THE PRODUCTION OF PURIFIED SILICON DIOXIDE
William Hughes, Stockton-on-Tees, and Arthur Wallace Evans and Bernard Harris, Middlesbrough, England, assignors to British Titan Products Company Limited, Billingham, England, a corporation of the United Kingdom
Filed Mar. 10, 1958, Ser. No. 720,470
Claims priority, application Great Britain July 25, 1955
3 Claims. (Cl. 23—182)

This application is a continuation-in-part of application Serial No. 598,913, filed July 19, 1956, now abandoned.

This process relates to the production of silicon dioxide by the vapour phase oxidation of silicon tetrachloride, and the purification of the silicon dioxide so produced.

Suitably prepared finely divided silica is becoming increasingly important as a filler and reinforcing agent for natural and synthetic rubbers and for synthetic and natural plastic materials, and also as a thickener and suspending gent for various liquid mixtures and suspensions, and as an agent for other uses.

Processes for the production of finely divided oxides, including silicon dioxide, have been suggested in which the corresponding vapourised halide, particularly the chloride, is converted to the oxide by various combustion processes involving oxidation or hydrolysis at elevated temperatures.

These processes, though varying considerably in detail, all require the use of burners or jet assemblies for feeding the reactant gases and vapours to the reaction space. The apparatus is often further complicated by the need to maintain the reaction temperature and, in some cases, to provide the moisture for the hydrolysis reaction by the simultaneous combustion of hydrogen, hydrocarbons or other vapourised fuels. In these processes it is rarely possible to increase the production of the apparatus by an increase in the size of the jets or burners as this usually leads to a deterioration in the quality of the product. Consequenly, for large scale production it is necessary to use a large number of similar jets or burners.

It is an object of the present invention to provide a process for the manufacture of silicon dioxide which is highly efficient and in which the reaction temperature can be readily controlled, which is more adaptable for large scale production, and which includes an improved procedure for purifying the silicon dioxide produced by such a reaction.

More specifically the process of the invention for the production of purified silicon dioxide comprises establishing a fluidised bed of solid inert particles, maintaining the temperature of said bed sufficiently high to cause silicon tetrachloride to react with oxygen, while introducing silicon tetrachloride and oxygen into said bed whereby silicon dioxide is formed, carrying silicon dioxide thus produced away with the gases leaving the fluidised bed, and purging the so produced silicon dioxide, whilst heated, with air or other innocuous gas.

The particulate inert solid material constituting the bed in which the reaction is to take place may be selected from sand-like materials, i.e. silica, zircon, mineral rutile, alumina or massive mineral rock materials which are resistant to chlorine or chlorine-containing substances likely to be present in the course of the oxidation reaction described and at the temperatures encountered. The sand-like material is preferably substantially entirely composed of particles not less than 76 microns in diameter and normally not greater than about one-eighth of an inch in size. The particle size of material should, in any case, be not less than 40µ, preferably 80µ, and not substantially greater than 1000µ diameter. It will be appre-

2 ciated that the term "massive mineral" relates to minerals which are of such compact nature that the density of each particle thereof approximates the density of a substantially perfect specimen of the material. The material comprising the fluidised bed should be such that it would fluidise in an air stream at a temperature of 1000° C. for 100 hours at a velocity five times the minimum fluidising velocity, and the amount of dust and fine material carried away in suspension in the emerging air stream would not exceed 5 percent (preferably one percent or below) of the material originally present in the bed.

The molar ratio of oxygen to silicon tetrachloride is preferably within the range 1:1 to 2:1. Higher oxygen ratios, e.g. up to 5:1, may be used but complete reaction of the silicon tetrachloride is normally achieved within the preferred range. Molar ratios less than 1:1 obviously give incomplete oxidation of the silicon tetrachloride.

The gases may be used in a relatively dry condition, or, for control in the reaction, certain proportions of moisture may be tolerated, particularly in the oxygen stream. It will be appreciated that the presence of large proportions of moisture is desirably to be avoided, since the presence of moisture may convert the chlorine to hydrochloric acid. The latter is generally detrimental to the process, in that hydrochloric acid cannot so readily be re-used for the purpose of chlorination, as normally conducted in accordance with the preferred process of this invention, which conveniently may utilise for the production of further supplies of silicon tetrachloride the chlorination of ferrosilicon. The latter reaction, whether hydrogen chloride or chlorine is used, is highly exothermic and it is essential to employ in conjunction therewith a means of indirect cooling which, in effect, normally means the use of metal and hence poses the problem of corrosion. Furthermore, in the chlorination of ferrosilicon with hydrogen chloride, hydrogen is formed and this entails the necessity of separation from the silicon tetrachloride vapour and involves certain additional safety precautions. Where the source of silicon tetrachloride is native silica, it is still more desirable that chlorine be used for chlorination, rather than hydrochloric acid.

The silicon tetrachloride is vapourised by any suitable means prior to being fed to the bed. The rate of feed of the silicon tetrachloride vapour and oxygen is primarily a function of the size of the apparatus, but there is additionally both an upper and lower limit for successful operation. The upper limit arises from the requirement of a sufficient retention time within the fluidised system, this retention time for a constant rate of feed per unit area being determined by the depth of the bed. Thus if the reaction is not complete in the bed some build-up will occur on the walls of the reaction chamber above the bed. The lower limit arises from the necessity of fluidising the bed.

In the process one at least of the reactants, preferably the air or oxygen, is fed through the base of the reaction vessel containing a columnar bed of material as defined above so that the gas velocity within the reactor is sufficient to maintain the bed in the fluidised state. The other reactant may also be fed separately through the base of the reactor or may be fed otherwise such as by injection in gaseous form into the bed at a point a short distance above the base of the reactor and preferably so as to deliver this reactant in a generally downward direction to encounter the rising air or oxygen.

The silicon tetrachloride and oxygen react within the bed to form silicon dioxide and chlorine, according to the equation:

$$SiCl_4 + O_2 = SiO_2 + 2Cl_2$$

Thus it will be seen that the formation of silicon dioxide is not caused by hydrolytic action, as has been the case hitherto in vapour-phase oxidations, and thus results in the formation of chlorine, rather than hydrochloric acid, which latter, as has already been mentioned, is generally detrimental to the process.

The silicon dioxide is initially produced in the form of finely-divided particles entrained in the other product gases, but may be separated from the entraining gases by simple devices as, for example, cyclones, since the particles readily agglomerate to form much larger aerogel-like flocs.

The gases may be cooled before passage through the cyclones by various procedures including re-circulation of tail gases, and the introduction of liquid coolants such as chlorine. Other methods include mechanical methods of an indirect nature generally well-known in the art. The silica produced according to the process of this invention is a very voluminous material, as is evidenced by its weight of 2–20 lbs. per cu. ft.

When oxygen is used in stoichiometric proportions in the reaction the product gas consists almost entirely of chlorine. In this case, after separation of the suspended silicon dioxide, the chlorine may be used directly for the production of fresh silicon tetrachloride or for other purposes. However, it may be found more convenient to recover the chlorine from the product gases by well known methods such as by refrigeration or adsorption in liquids. If air is used as the oxidising gas the resulting chlorine will be considerably diluted with nitrogen and the mixed gas can then be treated for recovery of chlorine by any well known means prior to discharge to atmosphere.

The silicon dioxide product as collected consists of fairly coarse flocs of silica gel. This product, shaken with water, may, depending on the efficiency of the chlorine separation, give a pH value of between 1 and 2 owing to the presence of acid and/or chlorine contamination from the reaction. The pH value of such a suspension can be brought up to between 4–7 by various means such as washing with water, but the preferred method according to the invention which is more particularly described hereinafter, and which preserves the initial character of the material, is to fluidise the product with hot air containing ammonia and preferably also water vapour or superheated steam, both at a temperature above 250° C., preferably at 300° C., or above.

The temperature of the fluidised bed should be within the range 500° C. to 1300° C. Though the reaction of silicon tetrachloride with oxygen is exothermic, the heat of reaction may not be sufficient to maintain the required reaction temperature when the process is worked on a small scale. In this case the required reaction temperature can be attained and maintained in various ways such as by separately preheating the reaction gases or by external heating of the reactor or by heating the bed of particulate material by indirect heat exchange with a heating coil within the bed or by other internal heating means, or by the admission of hot inert gases to the bed, or by admitting a combustible gas to the bed which burns with excess oxygen to give the required heat of reaction. The reaction gases may be premixed before they are fed to the reactor, but if in this case preheating is employed the temperature of the preheating should not exceed about 500° C. This is not a preferred method of operation as the ducts through which the gases are fed to the bed will, where in contact with the fluidised bed, normally attain the temperature of the bed, and there is therefore a likelihood of premature reaction within and consequent blocking of the feed ducts.

In the accompanying drawings which somewhat schematically illustrate apparatus embodying the invention and capable of being used in practising processes according to the invention:

FIGURE 3 is a vertical sectional elevation of a larger apparatus including a shaft furnace, a solids feed device and a solids-collecting cooling device, suitable for autothermal operation;

FIGURE 4 is a plan view of a detail of FIGURE 3;

FIGURE 5 is an enlargement in vertical elevation of a detail of FIGURE 3 slightly modified;

FIGURE 6 is a top plan view from above of FIGURE 5;

FIGURE 7 shows an enlargement in vertical sectional elevation of a modified detail of FIGURE 3;

FIGURE 8 is a top plan view of FIGURE 7;

FIGURE 9 is a diagrammatic sectional elevation of apparatus for separating products formed in the apparatus of FIGURE 3;

FIGURE 10 is a diagrammatic sectional elevation of a treating chamber for solid products obtained from the apparatus of FIGURE 9.

Figure 1:
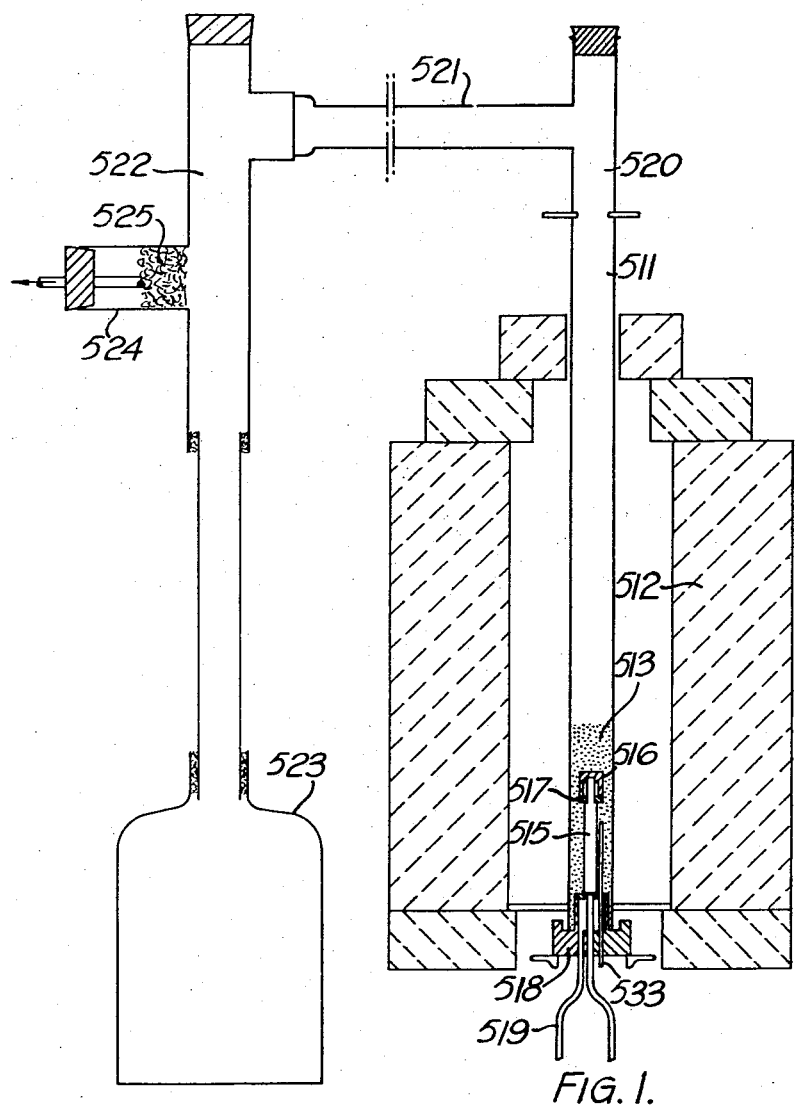
FIGURE 1 shows diagrammatically in sectional elevation the general nature and layout of a small-scale apparatus equipped with external heating means.

Performance of the process by using a small-scale apparatus will first be described by reference to FIGURES 1 and 2. In this construction, the reactor consists of a vertically disposed silica tube 511 having, say, an internal diameter of two inches and an overall length of 36 inches. The tube 511 is mounted within an electrical furnace indicated at 512 for applying heat over the lower two thirds of the length of the tube.

The reactants, i.e. oxygen or air on the one hand and vapourised silicon tetrachloride on the other hand, are introduced in the bottom part of the tube 511 by means which will be hereinafter described with particular reference to FIGURE 2.

The reactor tube 511 is charged with silica sand of average particle size of 140μ such that the static depth of the sand bed 513 in the tube is 7 or 8 inches.

The top of the tube 511 is connected to a junction piece 520 closed at the top and having a branch limb 521 which is connected to a shaft 522 leading downwards to a collecting vessel 523. The shaft 522 is provided with a side limb 524 for the withdrawal of product gases, a plug 525 of glass wool being situated in the side limb 524 to prevent solid matter passing out.

Figure 2:
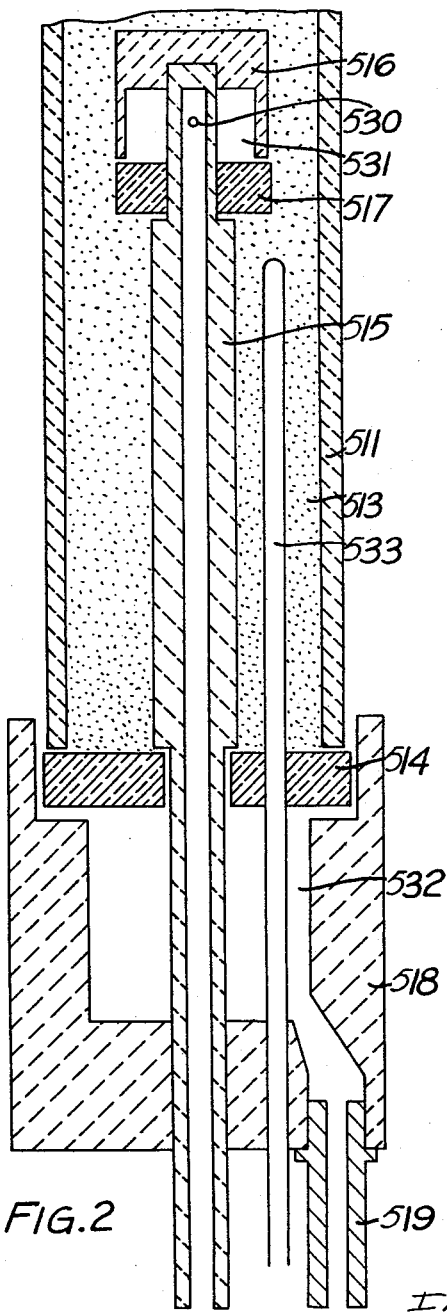
FIGURE 2 is an enlarged scale detail view in sectional elevation of the part of the apparatus shown in FIGURE 1 into which reactants are introduced.

Referring now to FIGURE 2, the bottom of the reactor tube 511 is fitted with a porous ceramic disc 514 through the centre of which passes a steatite tube 515 extending a short distance above the base of the reactor tube 511 and provided at the top with a cap 516 having at the bottom of a depending skirt portion thereof a porous ceramic disc 517. One or more holes 530 are formed in the top portion of the tube 515 to provide communication between the interior of the tube 515 and the space 531 in the cap 516 over the porous disc 517.

Underneath the reactor tube 511 is mounted a block 518 having a hollow space 532 underlying the porous disc 514. A conduit 519 is fitted into the bottom of the block to communicate with the space 532. Passing through the block 518 and the porous disc 514 is a thermocouple 533 to measure the temperature of the silica sand bed.

In operation the reactor tube 511 is heated by the electric furnace 512 so that the temperature of the bed of silica sand 513, as measured by the thermocouple 533, within the bed is 980° C. Vapourised silicon tetrachloride at the rate of 10 ml. of liquid silicon tetrachloride per minute is fed into the tube 515 whence it passes through the hole or holes 530 into the space 531 and then through the porous disc 517 in a general downward direction into the bed 513. Air or oxygen is fed into the bed through the tube 519, space 532 and porous disc 514 in an amount such that the molar ratio of oxygen to silicon tetrachloride is 2:1. The air or oxygen passing into the bed causes turbulences in the bed and brings it into a fluidised state. This will expand the bed to a height of about 11 to 12 inches.

The air or oxygen and the vapourised silicon tetrachloride react together within the bed of fluidised silica sand to produce fine particle size silica which is transported from the reactor tube in the form of an aerogel by the product gases passing up through the side limb 521 of the junction piece 520 and thence into the shaft 522. Flocculation of the particles occurs on leaving the bed and the material which is separted from the product gases in the shaft 522 and falls into the collecting vessel 523 consists of fairly coarse flocs of silica gel.

The gel particles were further treated with steam at a temperature of 300° C. and the resultant product was compared with the nearest commercially available fine particle size silica as follows:

| | SiO₂ Product of Invention | Nearest Commercially Available Silica |
|---|---|---|
| pH value | 4.1 | 4.4 |
| Surface Area (B.E.T. method), sq.m./g | 280 | 191 |
| Incorporated in silicone rubber and cured for 15 mins. at 265° F. and 1 hr. at 300° F.: | | |
| Tensile strength, lbs./sq. in | 670 | 530 |
| Hardness | 26 | 26 |
| Incorporated in silicone rubber and cured for 15 mins. at 265° F. and 1 hr. at 300° F., after ageing for 4 days at 480° F.: | | |
| Tensile Strength, lbs./sq. in | 410 | 390 |
| Hardness | 27 | 37 |

When compounded into a natural rubber the product containing the sample pigment was slightly slower curing than that containing the commercially available pigment, probably because of its higher surface area. The ultimate properties, however, were substantially the same.

Good results can be obtained wth considerably lower proportions of oxygen, e.g. a molar ratio of oxygen to silicon tetrachloride of 1.25:1.

The apparatus more particularly described hereinbefore is very useful when it is desired to carry out oxidation of silicon tetrachloride on a laboratory scale. However, when it is desired to carry out the operation on a large scale, the use of external heating should be avoided since, owing to the corrosive nature of the silicon tetrachloride and of the reaction products, the furnace is likely to be constructed of ceramic non-conductive material, and so external heating is not only uneconomic but is also difficult to control in the sense that the temperature conditions over a large reactor tend to be irregular, and this brings about variations in the product. An important advantage of the present invention is that it is possible to carry out autothermal oxidation of silicon tetrachloride on a large scale in such manner as to avoid the necessity of external heating, and the consequent variations in the product.

As has been indicated above, it is important to minimise variations in the product, and it is in consequence desirable to distribute the reactant gases uniformly over the cross-section of the reactor furnace. This problem is not of such great importance in small-scale reactors of the type which has been specifically described hereinbefore. With large-scale reactors it is far more difficult to obtain uniform conditions of fluidisation with a single port of entry, or with relatively crude methods of gas distribution as exemplified hereinbefore by a porous plate. According to the preferred method of operation according to the invention, it is possible to carry out the reaction on a large scale by introducing the two reactants in regulated amounts, and preferably separately, through a plurality of ports distributed over the cross-section of the reactor. In this preferred embodiment, which is hereinafter more particularly described, both reactants contribute to the fluidisation of the bed, and thus quickly intermingle and react while within the confines of the bed. Preferably the ports of entry of the two reactants should be alternated so far as possible.

Accordingly, there is hereinafter described the preferred method of operation, namely a process for producing silicon dioxide by reacting silicon tetrachloride vapour with oxygen in the course of their upward passage through a fluidised bed of inert solid material so that the silicon dioxide which is produced is at least for the most part discharged from above the bed entrained in outgoing gases, characterised by the following features:

(a) That the reactants are heated in the bed to the extent required to cause them to react so that external preheating is not required;

(b) That the bed, adequately insulated, contains a sufficient quantity of the inert solid material to conserve from the heat of the exothermic reaction what is necessary to effect continuously said heating of the reactants which are, or at least one of which is, being introduced so rapidly as to fluidise the bed in the desired manner;

(c) That the reactants are introduced into the bed through a plurality of inlet ducts distributed and mutually arranged with respect to the horizontal cross-sectional area of the bed so as to enable uniform fluidisation of the bed. The reactants may be pre-mixed but it is preferred to introduce them separately into the bed through respective inlet ducts distributed and arranged as aforesaid and so as to ensure the intermingling of the respective reactants required for their inter-reaction to take place within the bed;

(d) That the inlet ducts for the reactants are provided with constrictions of predetermined dimensions to ensure that a supply under pressure of the reactants, in their required proportions, is appropriately distributed among the inlet ducts appertaining thereto; and (e) That each constriction in an inlet duct produces a pressure drop from the pressure of the supply of reactant thereto which is at least one half of the pressure drop from the bottom to the top of the fluidised bed;

(f) The silicon dioxide is separated from the outgoing gases and is subjected, whilst heated, to the action of purging air or other innocuous gas.

As regards (a) above it will be understood that external preheating of the reactants is not completely precluded because, in the first place, the silicon tetrachloride will be preheated at least to the extent of vapourising it and, in the second place, there is no disadvantage, if convenient so to do, to use oxygen which is preheated to a moderately raised temperature. In fact it is desirable to preheat the oxygen at least to the extent necessary to prevent condensation of the silicon tetrachloride vapour, e.g. to a temperature of 50 to 100° C.

As regards (b) above it is obvious that the size of the cross-sectional area of the bed is a more important factor than height of the bed because increase of height to accommodate the required amount of bed material would unduly increase heat losses apart from requiring larger fluidising forces. Therefore, to achieve the desired autothermal operation of the process there is a minimum size for the cross-sectional area of the bed and we estimate that this means, assuming a cylindrical reaction chamber, that the diameter of the bed must be at least fifteen inches. It may be of course be larger but it should be borne in mind, that in designing for substantially larger diameters, the conserved heat may exceed what is required to maintain the reaction and that provision for cooling of the reaction zone should therefore be made.

The fluidised bed employed may be as described hereinbefore as to bed materials, particle size, and like details, except that, as has already been specified, there should be sufficient inert solid material to conserve from the heat of the exothermic reaction at least what is necessary to maintain continuance of the reaction.

As has already been mentioned, the gaseous reactants are continuously introduced into the insert hot bed through a plurality of inlet ducts to maintain uniformity of reaction throughout the bed. The velocity of the gas maintaining the bed in the fluidised state is desirably between two and fifty times the minimum required for fluidisation, and preferably between three and ten times such minimum. For this purpose, the inlet ducts are provided with the above-mentioned constrictions, the size of which is so chosen that with the necessary rate of gas-flow the pressure-drop across the constrictions is at least one half, and desirably less than fifty times, the pressure-drop of the gas in passing through the bed, thus affording a substantially even flow of the gaseous reactants over the whole of the bed material.

The pressure drop across the constrictions will generally exceed 2 lbs. per square inch, and the total pressure drop across the constrictions and the bed will generally be above 3 lbs. per square inch but rarely over 100 pounds per square inch.

The temperature of the reactor, when of internal diameter considerably greater than fifteen inches (say eighteen inches or greater) may be controlled, in the sense of being kept down as necessary, by the use of gaseous coolants as exemplified by chlorine, nitrogen, carbon dioxide or cooled recycled tail gases which may be introduced directly into the fluidised bed, or by liquid chlorine injected into or sprayed upon the bed. In addition, or alternatively, the temperature of the reactor may be controlled by introducing, progressively, relatively cool sand or other inert bed material into the bed, and correspondingly discharging hot sand from the bed.

The temperature of the fluidised bed, although it may range between 500° C. and 1300° C., is preferably maintained within the range of 900° C. to 1100° C., the range of 1000° C. to 1050° C. giving especially good results. Under the temperature conditions just specified, other general control factors may be varied to maintain the conditions desired. Thus the oxygen gas and silicon tetrachloride vapour will usually be fed to the reactor at a velocity (assuming the reactor to be empty) of from about one quarter to about two feet per second, or higher. Where the bed material is progressively fed into and out of the reactor, the rate of feed may vary, as illustrated in the examples. But any conditions used must be balanced for autothermal operation. In general, it may be noted that in any given installation the insulation is fixed, and the oxygen and silicon tetrachloride feed is determined at least in part by the amounts required to maintain fluidisation. Under these circumstances the temperature will usually be kept down within the desired range by feed of extraneous coolant or of bed material as mentioned above.

In a preferred embodiment, the reactor is essentially a vertical shaft, usually cylindrical, and lined internally with chlorine-resisting brickwork which, in turn, is protected by an outer shell of insulating brick, the whole being contained within a steel shell, the latter terminated at the top and the bottom with openings corresponding to the shaft on which are constructed extension pieces which are flanged to take a header in the case of the top and a hearth unit to be attached to the bottom. The latter unit desirably consists of a steel plate, surmounted by a heat-insulating block sealed thereto and itself surmounting gas-inlet and gas-supply means. The steel plate contains a number of apertures spaced uniformly according to a predetermined plan in order to provide for the admission of the reactants, and the insulating block contains a number of bores, in which refractory tubes may be fitted, to provide passages registering with the apertures. The apertures in the plate are fitted with gas-inlet means having constrictions of predetermined size. The passages through the insulating block may optionally be provided at their upper ends with devices designed to prevent solids from falling down therethrough but to permit the flow of gas upwards. Said block functions essentially to insulate from the heat of the reactor the metal plate and the gas inlet means and gas-supply devices positioned below. The whole hearth unit assembly is constructed so as to fit into the base of the furnace shaft so that the metal plate supporting the structure may be attached to the lower flanged end of the steel shell of the furnace.

One set of the inlet means is designed for the admission of silicon tetrachloride and another set, appropriately neighboured with the first mentioned set, for the admission of oxygen. The inlet means for silicon tetrachloride into the appropriate passages may be connected to one or more manifolds or to a windbox, and the inlet means feeding the oxygen may similarly be connected to a separate manifold, or manifolds, or windbox. In either case, it will be clear that the gas-inlet means, preferably welded on to or into the metal plate, will be of such length and so fabricated that they may be conveniently connected to link with the respective manifolds or windboxes. With a windbox construction, there may be a plug containing the above-mentioned constriction at the point of entry to each inlet means. In the case where a manifold is used, each inlet means may comprise a pipe with a flanged end connected with a corresponding flanged end of a pipe leading from the manifold, the constriction being present as an orifice in a disc held between the two flanged ends.

A preferred feature is that there should be admission of the oxygen reactant round the walls of the reactor, so far as possible, in order to avoid undue reaction at the static surface provided by the wall, as opposed to the dynamic surface provided by the fluidised particles.

Although it is desirable to incorporate as large as possible a number of gas ports into the base of the reactor, there should not be so many ports as will weaken the base of the reactor. It is also of course desirable to make the hearth unit at the base of the reactor as insulating as possible so as to retain the heat of reaction within the furnace.

A feature of this preferred embodiment of the invention is the use of constrictions of predetermined dimensions in the inlet ducts for the reactants. These constrictions are an important controlling factor in the system of gas distribution, and the dimensions are determined having regard to the fluidisation required, the properties, i.e., the density and viscosity, of the reactant gas, and the amount of gas which it is desired to admit, taking into account the number of inlet ducts available. It will be appreciated that the constrictions for the different reactants may be of different dimensions.

The header plate which is secured to the flanged end at the top of the steel shell of the furnace may be constructed with two openings, one for the temporary insertion of a poker or other suitable device to effect initial heating of the furnace and also for admission of the material forming the bed, and the other for conveying the products of reaction from the furnace to suitable cooling, collecting and/or separating devices to be described hereinafter.

With the hearth unit affixed, any one of the above-mentioned particulate inert solid materials, or a mixture of such materials, is fed into the furnace to a static depth desirably of approximately 1–3 feet. It may be more but this is usually unnecessary. The bed thus formed is then fluidised by a stream of air fed through the inlets at the base of the reactor, and a pre-ignited gas poker may be inserted into the bed. In this way, the furnace may be raised to a temperature of say approximately 1000° C., whereupon the gas poker is removed, and the inlet through which it was inserted suitably sealed. At this stage the air-stream is shut off and oxygen, or a gas rich in oxygen, is passed into the furnace through the appropriate inlets. The silicon tetrachloride ductings, inlets and passages are, to start with, swept with a stream of nitrogen, and then silicon tetrachloride is passed therethrough, whereupon reaction takes place substantially entirely within the bed. The silicon dioxide thus produced is carried up out of the bed entrained with the chlorine-containing product gases, and is desirably led from the furnace through the ducting in the header to suitable cooling, collecting and/or separating devices described later herein, which may be of various types.

The silica, as separated from the gases, e.g. by means of cyclones, is found still to contain appreciable quantities of adsorbed or combined chlorine and, depending upon the precise details adopted in the process, possibly some hydrochloric acid in addition. According to the invention, these contaminants, or at least the undesirable effects thereof, may be removed from the silicon dioxide by various means of heat treatment, especially at temperatures between 300–600° C. This purifying step may be conducted by passing air or other innocuous gas through the material which is either heated in situ or preheated beforehand, e.g. by passage, preferably countercurrent to an airstream, down a horizontal or inclined rotary tube of standard design, or by utilising a fluidised bed technique in which cold gas, as for example air, is fed for the purpose of fluidisation. An alternative procedure is to employ for this purpose pre-heated gases as fluidising agents. A preferred gas for this fluidisation is oxygen, including oxygen-containing gases, which, whether heated beforehand or becoming heated as a result of the fluidisation conditions imposed, may be thereafter conveyed to the oxidation chamber for use in the oxidation of further silicon tetrachloride.

Further, in conducting such after-treatment of the product, the gases used for removing or counteracting the effect of the undesirable constituents by means of a fluidised bed technique may preferably contain some added basic material, ammonia by choice, with or without water vapour, so as to accelerate the removal or neutralisation of the chlorine in the silicon dioxide. This addition may be accomplished quantitatively, e.g. by passing the gases either at room temperature or at an elevated temperature, through a tower in which a controlled amount of ammonia is admitted as a gas, or sprayed as an aqueous solution.

While as indicated, substantially all the silicon dioxide produced is carried forward entrained within the product gases, a small proportion of the silicon dioxide may adhere to the substrate material comprising the bed. Where the accumulation, after a period of time, becomes excessive, it may be necessary to discharge the bed completely and replace it, unless, as hereinbefore mentioned, the bed is progressively renovated.

It has already been demonstrated that the heat evolved by the oxidation reaction is utilised to maintain the temperature and is adequate to do so. Thus the chamber should be well insulated and the rate of heat lost to the surroundings should not be greater than the rate at which the heat is evolved. It follows, therefore, that for the process to be autothermal, the reaction chamber will require to be adequately fabricated for this purpose, both in regard to size and materials of construction. As has already been stated, it has been found in practice when using well-known materials of construction, that a minimum internal diameter of a cylindrical shaft furnace is about 15 inches. In employing a furnace of 15 inches in diameter it is possible to maintain the temperature by minor controls such as by slight variations in the rate of feed of the reactants. When, however, furnaces of larger construction are employed, it is desirable, rather than to employ constructional material giving less insulation to introduce into the bed cooling agents, as already indicated, whereby the temperature of reaction is kept down as required.

In a preferred embodiment, fully described hereinafter, cooling is effected and the temperature of reaction controlled by continuously feeding cool solid inert fluidisable material to the bed to replace a corresponding amount of hot material which is continuously discharged. The amount of discharge and replacement will depend on the temperature of the replacement material at the time of feeding and the amount of heat to be removed. Thus to get the maximum heat removal with a minimum amount of discharge and replacement, cold replacement material can be used. In the event, however, of it being desirable at the same time to increase the purge in the bed, the replacement material may be fed in at an elevated temperature so as to obtain the same cooling effect with a larger feed and in consequence a greater purge. It will be appreciated that there may be two requirements (a) to cool the bed, and (b) to purge the bed, and by varying the temperature of the replacement material there is a freedom of action in respect of the quantity thereof to be admitted. By such means, the bed may be progressively renovated, thus overcoming the possible drawback associated with accretion of synthetic silica on the bed particles.

In FIGURE 3 there is shown by the general reference numeral 1 a furnace chamber lined with chlorine-resisting brickwork 2 supported and lined on the outside with insulating brickwork 3, the whole being contained in a steel shell 5 which has openings at the top 6 and bottom 7. On to these openings are welded short collars 8, terminating in flanges 9, the whole being mounted by means not shown, so that furnace 1 stands vertically.

A metal base plate 10 has surmounting it a ceramic block 11 constructed so that when the base plate 10 is inserted into the bottom opening 7 of the furnace 1, it will neatly fit whereby the block 11 serves to insulate from the shaft of the furnace 1 the base plate 10 below. The base plate contains apertures 13 registering with bores 12 in the block 11, the apertures 13 and bores 12 being distributed over the plate 10 and block 11 in a design which is shown in plan view in FIGURE 4.

In this particular and somewhat simplified design, the bores 12 are subdivided into (1) a set of passages 112 for admission of the silicon tetrachloride, the passages 112 being arranged in the form of an octagon, i.e. there being eight passages surrounding the centre of the block 11, and (2) a set of passages 212 and 312 for admission of oxygen, these latter passages being arranged in the form of an outer octagon of passages 212 and an additional passage 312 in the centre of the block 11, the apertures 13 registering with the passages 112, 212 and 312, as has already been indicated.

The upper parts of the bores in the ceramic block 11 may be fitted with gas-emergent means designed positively to bar ingress of the bed material, and yet to permit the passage of the reactant gases, e.g. of the type described in British patent specification No. 724,193 and applications Nos. 4,973/55 and 29,584/56 but it is preferred to operate without the use of such devices, and have passages 12 of limited diameter such that the reactants may be fed with sufficient velocity to prevent solid body material from falling back into the passages. Thus FIGURE 3 shows passages 12 without any such devices.

FIGURE 3 shows an arrangement in which the passages 12 are fed with reactants from a manifold system. A similar system is also shown in more detail in FIGURE 5, although in the latter figure, solids non-return devices in the form of porous caps are shown in the upper portions 15 of the passages 12.

One manifold 25 distributes oxygen to passages 212 and 312, while another manifold 26 distributes silicon tetrachloride vapour to passages 112. All the passages 112, 212 and 312 communicate with pipes 41 which are welded to the plate 10 and are fitted with flanges 104 (see FIGURE 5) at their lower extremities. To each flange 104 is secured a flange 105 on a pipe 42 leading to the manifolds 25 and 26, respectively, for oxygen and silicon tetrachloride, a constriction being provided by a machined orifice 47 present in a disc 43 being held between the flanges 104 and 105.

FIGURES 5 and 6 also show the provision of gas-permeable solids-impermeable devices 102, 202 and 302, in the upper portions of the passages 112, 212 and 312, the latter being flared so as to accommodate the devices which prevent solids from falling into the passages and the gas-feeding systems, while allowing the gas to escape therethrough. It will be seen that the devices 202 and 302 in the oxygen inlet passages 212 and 312, respectively, are of larger size than the devices 102 in the silicon tetrachloride passages 112. Instead of these devices, other types may be used e.g. others described in British specification No. 4,973/55, but it is preferred to rely merely on the force of the fluidising gases to prevent solid material from falling into the feed system.

A further modification is shown in FIGURES 7 and 8 where refractory tubes 400 made for example of an aluminio silicate are fitted in the bores in the insulating block 11, and have outlets to the furnace in their tops as shown at 410. Pipes 41 welded to the plate 10 pass through the apertures therein and extend into the tubes 400. Sockets 401 are secured on the lower ends of the pipes 41 and these receive screw plugs 402 having orifice constrictions 403. It will be noted that certain of the pipes are coupled to downward extension pipes and that these have the sockets and plugs at their ends. The plugs of the pipes which are not extended downwards are open to a windbox 404 whilst those of the extended pipes are open to a windbox 405.

Windbox 404 is adapted to receive an oxygen supply through inlet 406, and windbox 405 to receive a silicon tetrachloride supply through inlet 407. It will be seen from the plan view of FIGURE 8 that the tubular passageways to the furnace for the oxygen are in groups 408 whilst those for the silicon tetrachloride are in intermediate groups 409. Although a windbox supply with orificed plugs is shown in FIGURE 7, it will be appreciated that manifolds, and constrictions formed in orificed discs, may be used instead. In fact the pattern of distribution of the respective inlet means shown in FIGURE 8 lends itself conveniently to a supply from manifolds because the latter can be straight, corresponding to the straight disposition of the passageways for the oxygen and silicon tetrachloride as seen in FIGURE 8. In that case the manifolds for the oxygen and silicon tetrachloride may be supplied in opposite directions from manifolds, as indicated by the arrows.

Reverting to FIGURE 3, the top 6 of the furnace is covered by a closure 40, which is affixed to the upper flange 9 and which surmounts a block 140 of insulating ceramic material. This closure is formed to provide a port 24 for feeding in the solid bed material which subsequently constitutes the bed in operation. The solid bed material is fed from a solids-feed device 71 which is shown diagrammatically in FIGURE 3. The solids-feed device consists of a 5 ft. length of steel tube, 6″ in internal diameter, with a tapered bottom to which is sealed flange pipe 72, 2″ in diameter, communicating with a source of compressed air. Above the taper at 73 is affixed a perforated plate, carrying holes 1/16″ in diameter and spaced at half-inch intervals to form a square pattern. The upper portion of the tubing is bisected over a length of 3 feet and the top of the lower portion thereof is sealed with a horizontal steel cover 74. An inclined flanged pipe 70, 2″ in diameter, leads directly to the furnace 1 from the lower part of the feed device at a point just below the cover. A flat steel strip 75 is sealed on to the bisected length of tubing, said strip projecting downwards to about 6″ from the base of the tube, measured from 73; the purpose of this projection being to prevent or minimise the effects of any back-flow of gases from the reactor.

There is also provided a port 126 in the side wall of the furnace 1 through which the products of reaction are conveyed to ancillary apparatus for separation. The ancillary apparatus in the form which is shown in FIGURE 9 consists of a conically-shaped receiving vessel 35 into which the products discharged from the port 126 of the furnace are led through a pipe 27 having a centrally-positioned discharge conduit 36. In this vessel, the greater part of the coarse silica agglomerates settle and may be discharged, periodically or continuously according to requirement, through a valve 28, being aided where necessary, by vibratory motion imparted to the sides of receiving vessel 35 by known means. The gases leaving this separator via conduit 29 are conveyed to a cyclone or, if necessary, a series of cyclones as represented by cyclone 30 wherein any of the finer agglomerates of silica produced may be separated from the gas stream, which is led off through ducting 34. The finer material descends through a pipe 32, is collected in a collector 33 below the cyclone, and is discharged through valve 31, either periodically or continuously according to requirement. The gases after being stripped of their solid content and usually containing chlorine as the main constituent, may be re-used directly for chlorination of silicon-containing material, as, for example, ferrosilicon, or they may be passed to conventional equipment for the removal of the chlorine constituent either by cooling, compression and liquefaction of the chlorine constituent or by absorption of the cooled gases in sulphur chloride or other suitable absorbent from which they may be regenerated by conventional means.

Solid material discharged from the base of separator 35 via valve 28 or from cyclone 30 via valve 31, is collected for subsequent removal of the absorbed chlorine-containing gases, either to intermediate storage or directly to a particular vessel about to be described, in which this operation may be conducted.

One method of accomplishing this object is by means of a vessel which in a simple form is shown in FIGURE 10 with the general reference numeral 51. It comprises a cylindrical container with a perforated base 55 through which the gases used for purging are admitted in such a way as to fluidise a bed of the solid material above it. The container may be heated externally by a suitable jacket 52 either electrically or by other means, such as a circulating gas or liquid. Gases entering via 53, either cold or heated, pass into windbox 54 and thence via perforated plate 55 into bed 56 and, while the gases are flowing, the bed 56 is maintained desirably at temperatures within the range 300–600° C.

It will be apparent that there are various ways of conducting this operation. Thus, it may be conducted batchwise or continuously. In the case of batch treatment, the process is comparatively simple in that the material is fed into vessel 51 through a conduit 58 and maintained therein while heated for a sufficient period such that the product is essentially purged of its acidity. The gases emerging from top 57 may, after suitable purging of the acidity, be discharged to atmosphere. The product after this purging treatment is discharged through outlet 59 by opening valve 60.

In a continuous process, the solids are continually fed through conduit 58, and solids are discharged through conduit 61 controlled by valve 62.

FIGURE 10 shows the chamber divided by means of a partition 63 so that material fed continuously through the conduit 58 and fluidised in the chamber cannot immediately discharge through 61 but by passage through the bed section 64 it is purged by the fluidising gases and by passage to the lower level of the partition 63 into the section of the bed 65 it will ultimately pass upward to be discharged through the conduit 61. As explained earlier, the gas used for drying and purging may be preheated or may be the sole source of heating for effecting the treatment of the silica material which constitutes the bed. It may further consist of air but is preferably oxygen containing entrained ammonia, with or without water vapour, in which case the gas is fed up through pipe 53 through windbox 54, perforated plate 55 and subsequently emerges from bed 56 via outlet 57, having purged the product, and is then available, if desired, for admission to the manifold 25 (FIGURE 3) and thence through the passages 12 into the reaction chamber 1. The material overflowing from port 61 is substantially free from combined or adsorbed chlorine and may have a pH above 3.5 and preferably 4.0–5.0.

Reverting to FIGURE 3, approximately 2 feet from its base, the furnace 1 is provided in the interior of the furnace with a conduit 77, which is fabricated in refractory chlorine-resistant brick, and inclined at an angle of about 45° to the vertical. The conduit 77 may either be sealed, or, if it is desired to introduce solid bed material and withdraw surplus material during operation of the apparatus, the lower (and outer) end of this conduit is connected by means of flanged joint 78 to a side arm 170 of a vertical pipe 79, 3" in internal diameter, sealed into a flanged lid 80 of a mild steel vessel 81, of diameter 8" and height 2 ft., the pipe 79 projecting downwards within the vessel 81 to a point approximately 3" above the top of its tapered base. Just beneath the lower extremity of pipe 79, a stainless steel disc 82, ½ inch thick, is affixed to the sides of vessel 81, said disc being perforated with holes of diameter $1/16$" arranged in a square pattern of side length 2". At a point approximately 6" from the sealed top, vessel 81 is provided with a pipe 83, which serves as a means of overflow. At the top of vessel 81 is a small outlet port 84 through which the fluidising gases can be voided to atmosphere. Through the lower extremity of its tapered base, vessel 81 is fitted with flanged pipe 85, connected with a source of compressed air. The part of the vessel 81 above the perforated disc 82 is encased in a steel jacket of conventional design 86, through which a stream of cold water can be continuously passed to cool the vessel.

Figure 11:
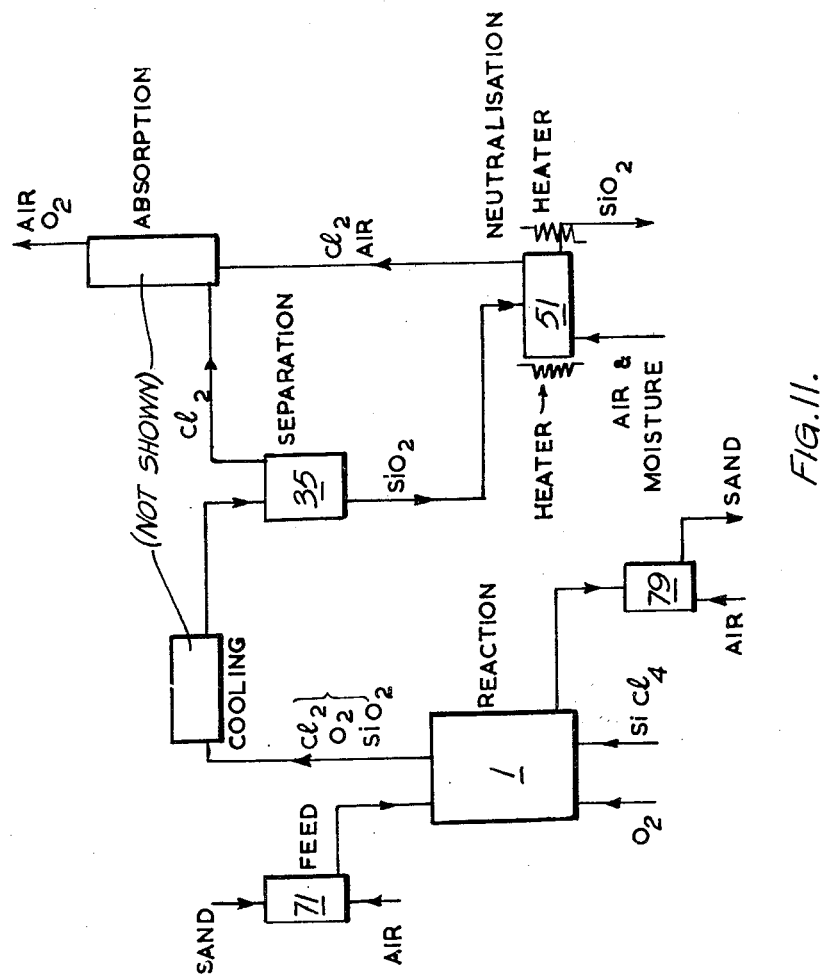
FIGURE 11 is a flow diagram illustrating the complete process operation.

A flow diagram is given in FIGURE 11 of the drawings to show how these various treatment steps may be correlated into a unitary process, it being understood that any individual treatment step diagrammatically illustrated in the flow diagram may be of the character illustrated above for FIGURES 3 to 10 or may take other forms. As illustrated, the sand or other bed material with or without pretreatment is fed continuously into the reaction zone into which the reactants oxygen and silicon tetrachloride are introduced. If the bed material is not fed continuously, it may be purged of accumulated silicon dioxide from time to time and replaced.

The product gases from the reaction zone entrain the silica and may be cooled and then separated. The silica product thus separated is purified by blowing air or oxygen therethrough while heating, which gas may or may not contain added ammonia depending on the conditions of operation. The silica may be sent to a grinding or dressing operation and then to storage.

The flow diagram thus illustrates a variety of mutually co-operating steps in processes for producing oxides of silicon, by the oxidation of silicon tetrachloride.

The following examples are given for the purpose of illustrating the invention; all flow rates of gas are calculated on the basis of atmospheric conditions of temperature and pressure.

*Example 1*

The reactor consisted of a vertical shaft furnace 1, substantially as illustrated in FIGURE 3 and having an internal diameter of 15 inches and an overall height of 7 feet. It was lined with chlorine-resistant brickwork 2 of thickness 9 inches, and insulated by brickwork 3 of thickness 3 inches on the outside, the whole being contained within a steel shell 5 with openings 6 and 7 corresponding to the vertical shaft.

The opening 7 at the base was sealed by an apertured plate 10 substantially as illustrated in FIGURE 3, supporting a block of chlorine-resistant concrete of thickness 9 inches and having seventeen passages 112, 212 and 312 uniformly spaced as shown in plan in FIGURE 4, corresponding to seventeen apertures 13 in the plate 10. On the under side of the plate 10 ducting and manifolds were installed as hereinbefore described with reference to FIGURES 3 and 5. The silicon tetrachloride vapour constrictions in the inlet means were of diameter $3/32$ inch, whereas the oxygen constrictions were of diameter $1/16$ inch.

The top 6 of the furnace 1 was sealed with an insulated plate 40 of thickness 6 inches carrying a port 24, serving as a feed inlet for the substrate material comprising the bed to be fluidised, and also serving for the insertion of a gas poker for preheating the bed; a second port 126 in the wall of the furnace served for conducting the products of reaction from the furnace.

The inclined conduit 77 was in this case sealed at its flange.

In the operation of this plant, silica sand of average diameter 250 microns was fed into the reactor in such quantity that the depth of bed when fluidised was about 36 inches. The sand was fluidised by air fed via the manifold system to all seventeen passages. By insertion of a pre-ignited gas poker through the port 24, the bed was preheated to a temperature of 1250° C. At this stage, the gas poker was removed and the port 24 was sealed. Meanwhile, the air supply was substituted by an oxygen supply through the manifold 25 leading to the central passage and the outer ring of passages at the rate of 155 litres per minute and, as a precaution, nitrogen was fed through the manifold 26 leading to the eight inner passages (through which the silicon tetrachloride is intended to flow) in order to free the whole of the inlet means from oxygen and oxygen-containing gases. The nitrogen stream was then arrested and replaced by silicon tetrachloride, to be led into the already fluidised bed. Liquid silicon tetrachloride was measured at the rate of 375 cc. per minute into a steam-jacketed vapourising tube wherein it was converted completely to gaseous form and was thereafter led into the fluidised bed reaction zone in the aforementioned manner. The molar ratio of silicon tetrachloride to oxygen was 1:2 and, although this was maintained, there were minor adjustments in the feed rate of the reactants to maintain the temperature at 1000–1050° C., within the period of operation, i.e., 5 hours. The silicon tetrachloride reacted with the oxygen within the bed to produce chlorine and silicon dioxide, the latter being removed from the bed through port 126 in an entrained stream which was conveyed through cooling and separation units, whereby the silicon dioxide was collected and the chlorine subsequently absorbed in sulphur chloride for regeneration.

The silicon dioxide product had a particle size of about 0.002 micron.

*Example 2*

In this instance, the reactor was similar in construction to that used in Example 1, but with the following differences.

The internal diameter was 18 inches and overall height was 7 feet. The diameter of the constrictions in the manifold system were for silicon tetrachloride admission $7/64$ inch, and for the oxygen admission $5/64$ inch.

The inclined conduit 77 shown in FIGURE 3 was lined with chlorine-resistant brickwork of thickness 3 inches, and was positioned at a height of about 40 inches from the bottom of the furnace.

Silica sand of average diameter 250 microns was fed by means of a belt lift at a controlled rate of the order of 26 lbs. per hour to the top of the solids-feeding device as shown in the top left portion of FIGURE 3. The sand thus fed accumulated above the perforated plate 73 and was brought into a fluidised state, and to an expanded height of about 2½ feet on the side of the baffle 76 remote from the exit duct 70, by means of compressed air admitted at a rate of 130 litres per minute through the pipe 72 entering the bottom thereof. A portion of the expanded bed overflowed via duct 70 to enter the furnace and the sand was fed at a rate sufficient to control the reaction temperature. The height of the fluidised bed in the furnace 1 was established at about 40 inches by means of overflow through the inclined conduit.

The bed within the furnace 1 was continuously renewed, portions thereof overflowing as aforesaid and fresh bed material being admitted to the furnace from the solids feed device via conduit 70.

Such bed material as overflowed from the furnace 1 passed down into vessel 81, therein to accumulate above the perforated plate 82, and was fluidised by passing a current of compressed air into the vessel through pipe 85 located at its base. This treatment effectively removed from the sand any residual traces of chlorine or other undesired gases. When the sand which had accumulated in vessel 81 was fully fluidised, portions thereof overflowed at a constant rate through pipe 83.

With the sand feed suspended, the bed was preheated to about 1200° C. as in Example 1. Oxygen was supplied at a rate of 209 litres per minute, and silicon tetrachloride liquid was metered at the rate of 654 cc. per minute into the steam-jacketed vapourising tube, the molar ratio of silicon tetrachloride to oxygen being 1:1.5. The temperature was maintained at 1000–1050° C. during a 5 hour period of operation by continuous slow replacement of the sandy substrate in the reactor, as described above. The fine silicon dioxide product emerging from the horizontal port 126 at the top of the furnace 1 was cooled and separated from the entraining gas, and then subjected to heat-treatment to remove therefrom adsorbed chlorine and/or hydrochloric acid.

The fine silicon dioxide so obtained after the heat-treatment consisted of a finely-divided product having an average particle size of less than 0.005 micron and a bulk density of 5 lbs. per cu. ft.

*Example 3*

In this instance the reactor was of the same construction and dimensions as in Example 2.

The silica sand constituting the bed had an average diameter of 250 microns and was fed into the furnace to a fluidised depth of 40". The oxygen was supplied at a rate of 209 litres per minute measured at room temperature. The silicon tetrachloride liquid was metered at the rate of 654 cc. per minute, also at room temperature, through a steam jacketed vapourising tube. The molar ratio of silicon tetrachloride to oxygen was 1:1.5. In this instance the oxygen used had additionally a moisture content of 1.3% molar with respect to oxygen, this moisture-content being obtained by bleeding off prior to admission 11 litres per minute of the 209 litres per minute total oxygen stream, and bubbling these 11 litres per minute through water contained in two steel vessels each containing three foot six inches depth of water, maintained at 70° C.

The temperature of the reactor was maintained at 1000–1050° C. during a 7-hour period of operation by continuous slow replacement of the silica sand substrate in the reactor as described below.

Utilising the bed material feeding system as shown in FIGURE 3 the modus operandi of such cooling system employed in the example was as follows:

By means of an insulated filament wound in the form of a helix round the outside of vessel 71, the latter was heated electrically by a circuit providing 5 kw. of power. The cold sand was fed at the rate of 40 lbs. per hour to the top of the solids-feeding device and was heated and fluidised within the vessel 71 by means already described, i.e. by compressed air admitted at the rate of 130 litres per minute through the pipe 72 entering through the bottom and through the perforated plate 73.

The temperature of the sand was controlled at about 400° C., and overflowed through the conduit 70 into the furnace 1. In this way the furnace 1 was maintained at the desired temperature of 1000°–1050° C., and, at the same time, the bed was continuously renewed so as to avoid excessive build-up of reaction products on to the substrate, the surplus substrate overflowing as previously described through the inclined conduit 77.

The silicon dioxide product discharge from the furnace 1 through the port 126 was collected in an agglomerated condition after cooling in a cyclone.

It had an average size of about 0.004 micron. The bulk density of the agglomerated material was 4½ lbs. per cu. ft. After heat treatment, when two grams of this silica product was shaken with 20 cc. of water the suspension had a pH value of 4.1 as compared with a pH of 2.2 before the heat treatment. It had a surface area of 260 sq. meters per gram as measured by the B.E.T. method.

What is claimed is:

1. In a process for the manufacture of purified silicon dioxide, including vapour phase oxidation of silicon tetrachloride with a gas comprising free oxygen, the silicon tetrachloride and oxygen being substantially the only reactants, at a temperature in the range of from 500° C. to 1300° C. in a fluidised bed of particulate solid inert material having a mean particle size of from about 40µ to about 1,000µ to produce silicon dioxide and chlorine which are continuously delivered from the bed, the silicon dioxide consisting of aggregates of fine particles being in a fine flocculent state entrained in the chlorine, and the silicon dioxide particle aggregates being thereafter separated from the chlorine; the step of subjecting said silicon dioxide particle aggregates to the action of a purging gas selected from the group consisting of air, oxygen, oxygen carrying ammonia, a mixture of air and ammonia, and an air-water vapour-ammonia mixture at a temperature of from about 250° C. to about 600° C. to remove contaminants from the silicon dioxide.

2. A process as set forth in claim 1 in which the aggregates of fine silicon dioxide particles, after separation from the chlorine, are formed into a bed of said aggregates and the purging gas is passed through said bed of aggregates at a velocity to fluidise the silicon dioxide particle aggregates in the bed formed thereby.

3. A process as set forth in claim 2 in which the aggregates of fine silicon dioxide particles are progressively fed in the unpurified state into said bed of aggregates and are progressively withdrawn in the purged and purified state out of said bed of aggregates.

References Cited in the file of this patent

UNITED STATES PATENTS

| | | |
|---|---|---|
| 2,023,278 | McGregor et al. | Dec. 3, 1935 |
| 2,233,155 | Adams | Feb. 25, 1941 |
| 2,400,907 | Behrman | May 28, 1946 |
| 2,503,788 | White | Apr. 11, 1950 |
| 2,614,906 | Spialter et al. | Oct. 21, 1952 |
| 2,715,060 | Barry | Aug. 9, 1955 |
| 2,760,846 | Richmond et al. | Aug. 28, 1956 |
| 2,798,792 | Stelling et al. | July 9, 1957 |
| 2,823,982 | Saladin et al. | Feb. 18, 1958 |
| 2,828,187 | Evans et al. | Mar. 25, 1958 |
| 2,841,476 | Dalton | July 1, 1958 |

FOREIGN PATENTS

| | | |
|---|---|---|
| 518,640 | Canada | Nov. 22, 1955 |